(12) United States Patent
Basilious

(10) Patent No.: US 12,068,611 B2
(45) Date of Patent: Aug. 20, 2024

(54) ENERGY-GENERATING WINDOW AND DOOR LATCH ASSEMBLIES AND ALARM SYSTEM POWERED THEREBY

(71) Applicant: HAMPTON PRODUCTS INTERNATIONAL CORPORATION, Foothill Ranch, CA (US)

(72) Inventor: Kyrilous Basilious, Corona, CA (US)

(73) Assignee: HAMPTON PRODUCTS INTERNATIONAL CORPORATION, Foothill Ranch, CA (US)

( * ) Notice: Subject to any disclaimer, the term of this patent is extended or adjusted under 35 U.S.C. 154(b) by 282 days.

(21) Appl. No.: 17/330,010

(22) Filed: May 25, 2021

(65) Prior Publication Data
US 2021/0376657 A1   Dec. 2, 2021

Related U.S. Application Data

(60) Provisional application No. 63/030,127, filed on May 26, 2020.

(51) Int. Cl.
| | | |
|---|---|---|
| *H02J 50/00* | (2016.01) | |
| *E05C 1/00* | (2006.01) | |
| *E05C 3/00* | (2006.01) | |
| *G08B 13/22* | (2006.01) | |
| *H01F 7/02* | (2006.01) | |
| *H02J 50/10* | (2016.01) | |

(Continued)

(52) U.S. Cl.
CPC ............ *H02J 50/001* (2020.01); *E05C 1/004* (2013.01); *E05C 3/006* (2013.01); *G08B 13/22* (2013.01);

(Continued)

(58) Field of Classification Search
CPC ......... H02J 50/005; H02J 50/001; E05C 5/02; E05B 2047/0069; G01P 15/11; G01P 15/135
See application file for complete search history.

(56) References Cited

U.S. PATENT DOCUMENTS

| | | | |
|---|---|---|---|
| 6,075,754 A | 6/2000 | VanZandt et al. | |
| 7,605,482 B2* | 10/2009 | Brown | H02K 35/02 290/1 R |

(Continued)

OTHER PUBLICATIONS

M R Sarker et al.; "Designing a Battery-Less Piezoelectric based Energy Harvesting Interface Circuit with 300 mV Startup Voltage"; Journal of Physics: Conference Series. 431, 012025; IOP Publishing Ltd.; 9 pages; 2013.

(Continued)

*Primary Examiner* — Mirza F Alam

(57) ABSTRACT

An alarm system includes a latch assembly having a movable element mounted on one of an entry and a structural element, and a fixed element mounted on the other of the entry and the structural element, wherein the movable element is movable between an engaged position with the fixed element and a disengaged position from the fixed element. A magnet is provided in one of the movable element and the fixed element, and a coil is provided in the other of the moveable element and the fixed element. The magnet and the coil are positioned relative to each other so that an electric current is induced in the coil by the magnet when the movable element is moved between the engaged position and the disengaged position. An energy harvesting circuit connected to the coil converts the induced electric current into a supply voltage that powers the alarm system.

21 Claims, 7 Drawing Sheets

(51) Int. Cl.
 *E05C 1/04* (2006.01)
 *E05C 3/14* (2006.01)
 *G08B 7/06* (2006.01)

(52) U.S. Cl.
 CPC ............... *H01F 7/02* (2013.01); *H02J 50/10* (2016.02); *E05C 1/04* (2013.01); *E05C 3/14* (2013.01); *G08B 7/06* (2013.01)

(56) References Cited

U.S. PATENT DOCUMENTS

2005/0092045 A1* 5/2005 Dimig .................... E05B 79/20
 70/277
2011/0254285 A1* 10/2011 Hanchett, Jr. ........ H02K 7/1853
 290/1 R
2016/0003922 A1* 1/2016 Smith ................... E05C 19/163
 324/207.13
2021/0207411 A1* 7/2021 Cumbo .................. E05B 81/18

OTHER PUBLICATIONS

Linear Technology Corporation; "LTC3331 Nanopower Buck-Boost DC/DC with Energy Harvesting Battery Charger"; www.linear.com/LTC3331; 34 pages; 2014.

TE Connectivity; "KMT32B Magnetic Angle Sensor"; Sensor Solutions; KMT32B Rev 6, pp. 1-6; Measurement Specialties, Inc.; Jun. 2017.

* cited by examiner

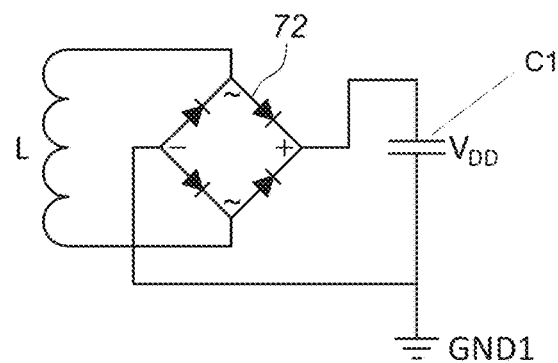
FIG. 6
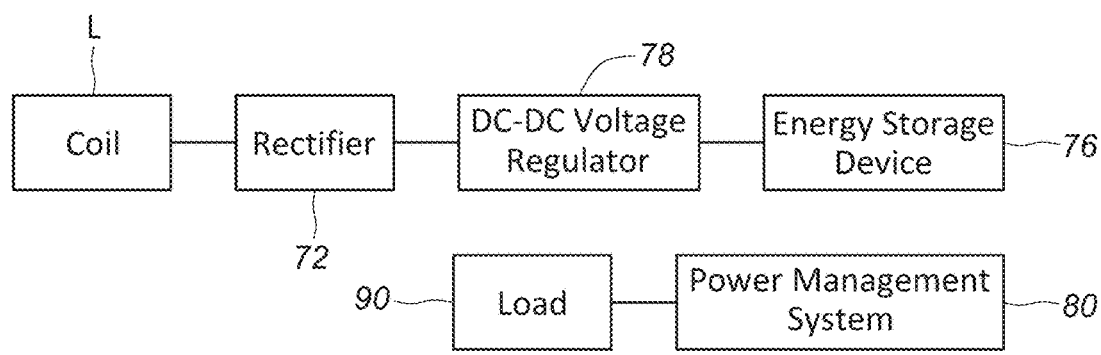
FIG. 7
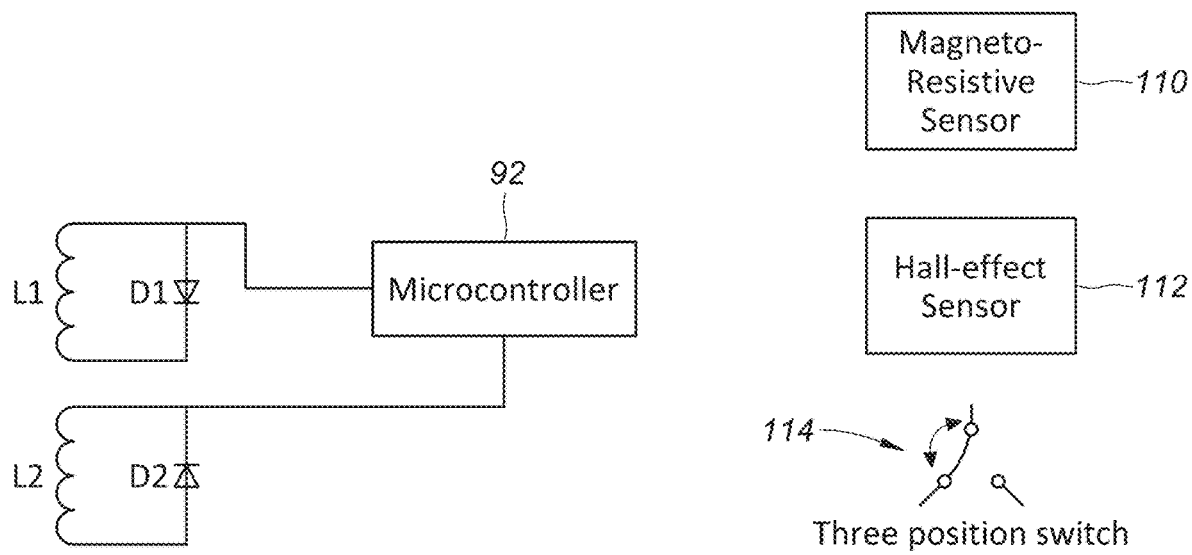
FIG. 8
FIG. 9

ENERGY-GENERATING WINDOW AND DOOR LATCH ASSEMBLIES AND ALARM SYSTEM POWERED THEREBY

CROSS REFERENCE TO RELATED APPLICATION

This application claims the benefit, under 35 U.S.C. 119(e), of U.S. Provisional Application No. 63/030,127, filed May 26, 2020, the disclosure of which is incorporated herein by reference in its entirety.

FEDERALLY FUNDER RESEARCH OR DEVELOPMENT

Not applicable.

BACKGROUND

Windows and doors are commonly secured to a structural member (door frame or door jamb, window frame or sash) with a latch or a bolt, such as, for example, a barrel bolt, a thumb latch, an in-swing latch, an out-swing latch, a rotating latch, or a push-button latch. The latch or bolt on the door or window is movable into engagement with a securement device, such as a bolt receptacle or latch clasp, fixed to the structural member in a position to be engaged by the latch or bolt to secure the door or window in a closed position against the structure.

Frequently, it is desired to monitor whether the door or window is in a secured state or unsecured state. Various sensors have been used to detect whether the latch or bolt is engaged with, or disengaged from, the securement device, and then to generate a signal (e.g., to an alarm or a remote receiver) indicating the state of the bolt or latch. Such sensors typically require a source of electrical current, such as a battery, or in some cases, an AC line, to operate. For a variety of reasons, in some situations or applications, the use of an external power source may be problematic or undesirable. For example, if a battery is used, it will need to be replaced, the more often the more frequent the use of the latch or bolt. In many situations, AC line current is unavailable or, at best, difficult to hook up.

Thus, there is a need for a sensor that can generate a state-indicative signal for a door or window without the need for an external current source.

SUMMARY

In accordance with its broader aspects, this disclosure relates to an entry latch alarm system for latching an entry (e.g., window or door) to a structural element, the system comprising a latch assembly and an alarm system powered by an electric current generated by the movement of the latch assembly between a latched position and an unlatched position. The latch assembly comprises a movable element mounted on one of the entry and the structural element, and a fixed element mounted on the other of the entry and the structural element, wherein the movable element is movable between a first position engaged with the fixed element when the latch assembly is in a latched state (as when the entry is closed), and a second position disengagement from the fixed element when latch assembly is in the unlatched state (as when the entry is displaced from the closed position toward the open position); a magnet in one of the movable element and the fixed element; and a coil in the other of the moveable element and the fixed element; wherein the magnet and the coil are positioned relative to each other so that an electric current is induced in the coil by the magnet when the movable element is moved between the first position and the second position. An energy harvesting circuit is connected to the coil and configured for converting the induced electric current into a supply voltage, and the alarm system is powered by the supply voltage.

In accordance with another of its broader aspects, this disclosure relates to an energy-generating entry latch assembly having a movable element and a fixed element; a magnet in one of the movable element and the fixed element; a coil in the other of the movable element and the fixed element, wherein movement of the movable element relative to the fixed element induces an electric current in the coil; and an energy harvesting circuit operable connected to the coil and configured for converting the electric current into a supply voltage.

In yet another aspect, the disclosure relates to an energy-generating entry latch assembly having a movable element and a fixed element. A magnet can be the movable element or fixed to the movable element, and the coil can be the fixed element or fixed to the movable element. The magnet can be moved into or further into the coil by a latch moving element to induce electric current to be harvested by an onboard circuit.

In accordance with still another of its broader aspects, this disclosure relates to a method of powering an entry alarm system, comprising: inducing a current by movement of a movable element of an entry latch assembly relative to a fixed element of the entry latch assembly; converting the induced current into a supply voltage; and using the supply voltage to power the entry alarm system.

In general, this disclosure relates to the conversion of mechanical motion of a bolt or a latch, such as a thumb latch, an in-swing latch, an out-swing latch, a rotating latch or a push button latch, to electrical energy harvested via means of passing a magnet around a conductive coil. The harvested electrical energy can be converted to a radio frequency signal to be received by a local wireless network or a cellular device, thereby triggering an alarm coupled to the wireless network or contained in the cellular device.

BRIEF DESCRIPTION OF THE DRAWINGS

FIG. 6 is a schematic diagram of an aspect of the power supply of FIG. 5A in accordance with aspects of the disclosure.

FIG. 7 is a functional block diagram of another exemplary embodiment of a power supply in accordance with aspects of the disclosure.

FIG. 8 is a simplified schematic diagram of another aspect of the power supply of FIG. 5A, in accordance with aspects of the disclosure.

FIG. 9 diagrammatically illustrates alternative types of position sensors that may be used in exemplary embodiments of the disclosure.

DETAILED DESCRIPTION

For the purposes of this disclosure, an "entry" includes a window, a door, or any other means of entry into, or egress from, a building or the like ("building"), wherein the entry is operable between an open position and a closed position with respect to a structural element (e.g., door jamb or frame, or window frame or sash) of the building. A "latch assembly" includes a movable first member (e.g., a linearly slidable barrel bolt or a pivotable latch), that is fixed to one of the entry and the structural element, and a fixed second member (e.g., a fixed bolt receptacle or a fixed pin or rod) with which the first element is engageable, that is fixed to the other of the entry and the structural element. In typical applications using a bolt/receptacle assembly, the movable barrel bolt is mounted on the entry so as to be engageable with a receptacle attached to the structural element. In typical applications using a pin/latch assembly, the pin is fixed to the entry and the pivotable latch is mounted on the structural element, whereby the pin is engageable with the latch. These arrangements of latch assemblies are not, however, exclusive.

Figure 1A:
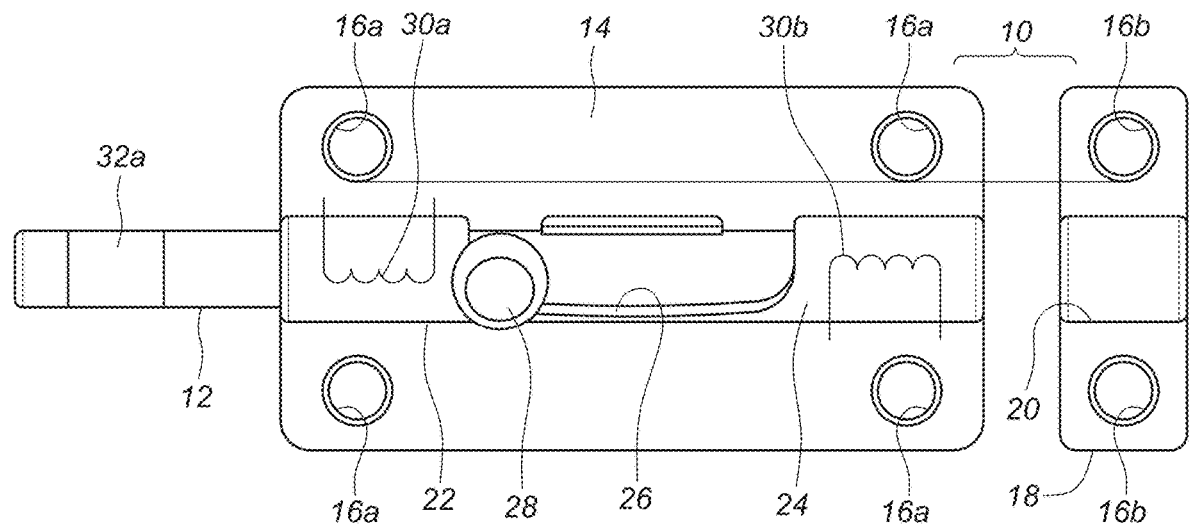
FIGS. 1A and 1B are semi-diagrammatic views of a door or window latch with a self-powered entry sensor in accordance with an embodiment of this disclosure.
Figure 1B:
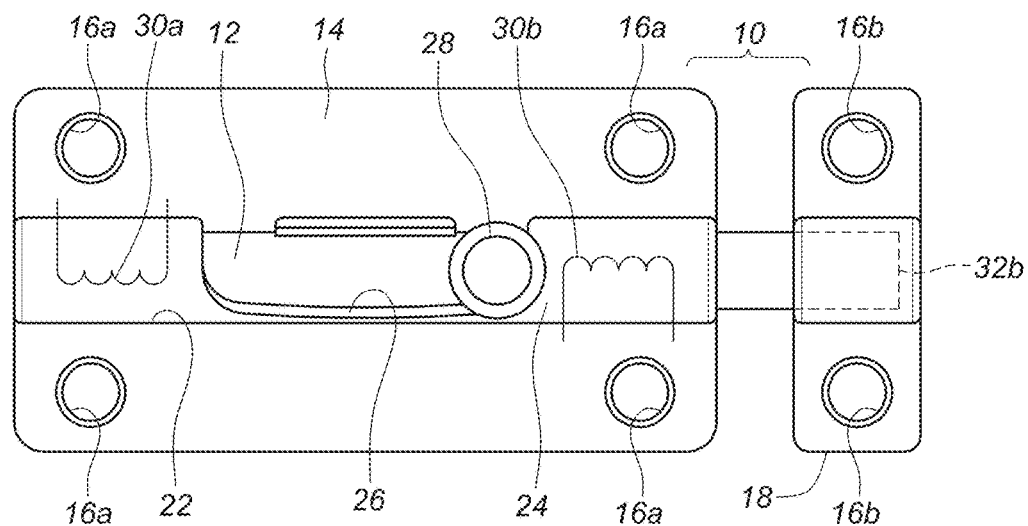

FIGS. 1A and 1B show a self-powered entry sensor embodied in a barrel bolt latch assembly 10, of the type used to secure a closed door (not shown) or a closed window (not shown) to a building structural element (not shown), such as a door jamb or a window frame. FIG. 1A shows the latch assembly 10 in an unlatched position, and FIG. 1B shows the latch assembly 10 in a latched position.

As in typical barrel bolt latch assemblies, the assembly 10 includes a movable first element configured as a barrel bolt 12 slidably mounted on a base or support 14 that is secured to a door or window by means of fasteners (e.g., screws, not shown) inserted into mounting holes 16a. A fixed second element, configured as a bolt receptacle 18, is fixed to the structural element by fasteners (not shown) inserted into mounting holes 16b. The receptacle 18 has a bore 20, and it is positioned on the structural element so that the bore 20 is aligned with the bolt 12, so as to receive a first end of the bolt 12 when the bolt 12 is moved linearly into a locking position, as discussed below. The bolt 12 is journaled in a sleeve on the base or support 14, the sleeve having a distal tubular portion 22 and a proximal tubular portion 24, where "distal" and "proximal" are defined, for the purpose of this disclosure, relative to the receptacle 18. The distal tubular sleeve portion 22 and the proximal tubular sleeve portion 24 are separated by an elongate opening 26 that accommodates a knob or handle 28.

In accordance with embodiments of this disclosure, at least one inductive coil is provided in the latch assembly. The embodiment shown in FIGS. 1A and 1B includes two such coils, but the number can vary from one to more than three. As illustrated schematically in FIGS. 1A and 1B, a first coil 30a is embedded in the distal tubular sleeve portion 22, and a second coil 30b is embedded in the proximal tubular sleeve portion 24. Each of the coils 30a, 30b is electrically connected to a circuit that generates a latch state-indicative signal, as explained below with respect to FIGS. 5A-8.

In the illustrated embodiment, a first magnet 32a is incorporated at or near the distal end of the bolt 12, and a second magnet 32b is incorporated at or near the proximal end of the bolt 12. In other embodiments, the bolt may have three or more magnets integrated into its structure.

Operationally, as is well known, the barrel bolt 12 is movable linearly between the unlatched position (FIG. 1A) and the latched position (FIG. 1B). In accordance with this disclosure, such linear movement causes the magnets 32a, 32b to move with respect to the coils 30a, 30b, thereby inducing a current in the coils that is used to provide power for the processing circuitry described below and processed as a state-indicative signal. Thus, the movement of the barrel bolt 12 itself generates electrical energy, as an induced current in the coils, that is harvested, for example as described below, to power the circuitry that produces a state-indicative signal, thereby obviating the need for a separate power source.

Figure 2:
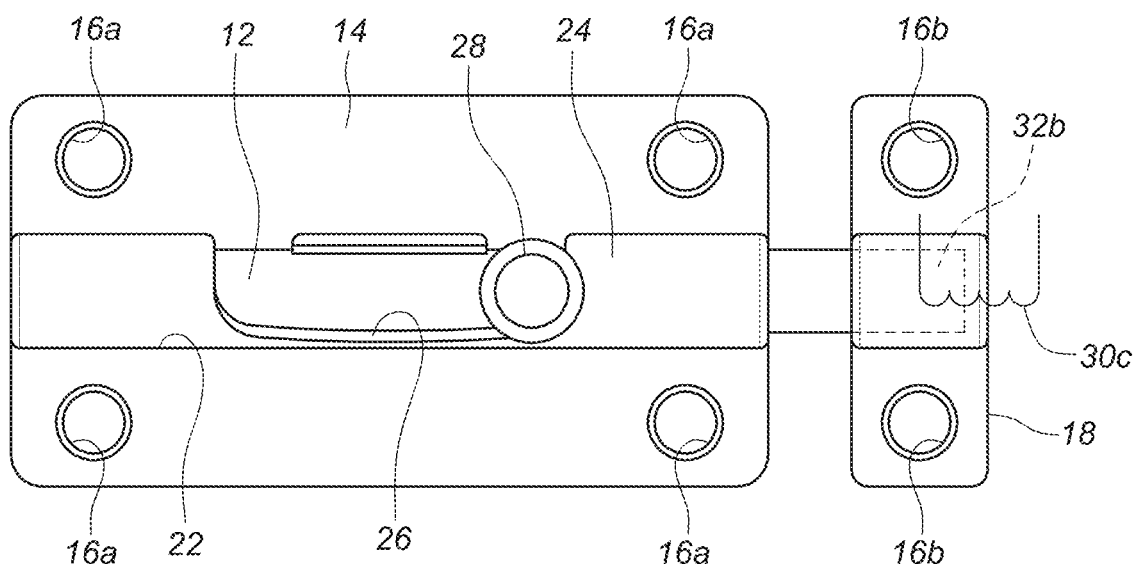
FIG. 2 is a semi-diagrammatic view of a door or window latch with a variant of the self-powered entry sensor shown in FIGS. 1A and 1B.

FIG. 2 shows a variation of the above-described embodiment, in which a third coil 30c is provided in the bore 20 of the receptacle 18, either instead of, or in addition to, the first and second coils 30a, 30b referenced above. In this variant, the movement of the second or proximal bolt magnet 32b past the third coil 30c induces a current in the third coil 30c that is conducted to the energy-harvesting circuit, as discussed below.

Figure 3A:
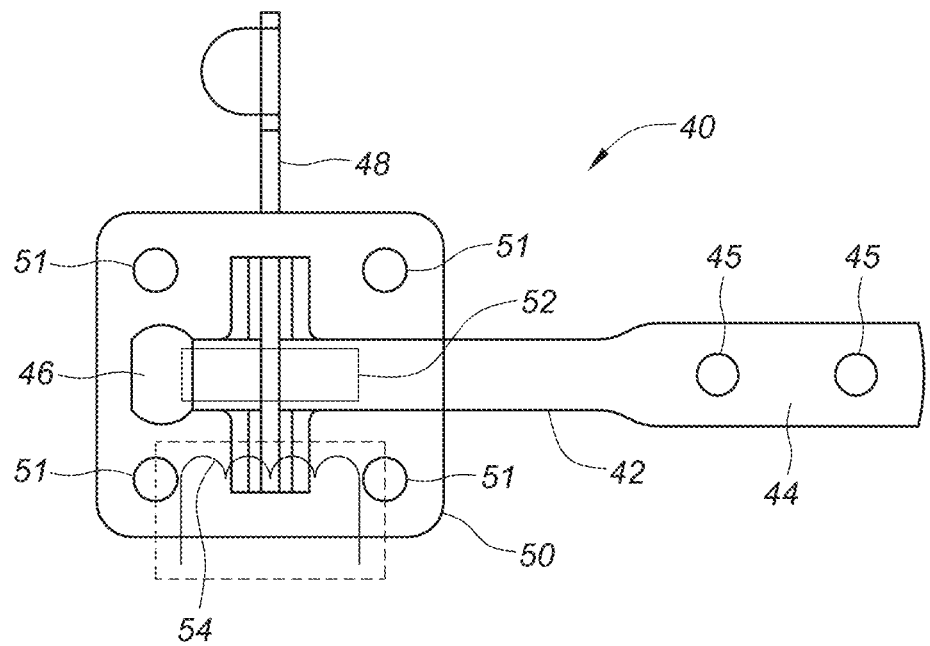
FIGS. 3A and 3B are semi-diagrammatic views of a door or window latch with a self-powered entry sensor in accordance with another embodiment of this disclosure.
Figure 3B:
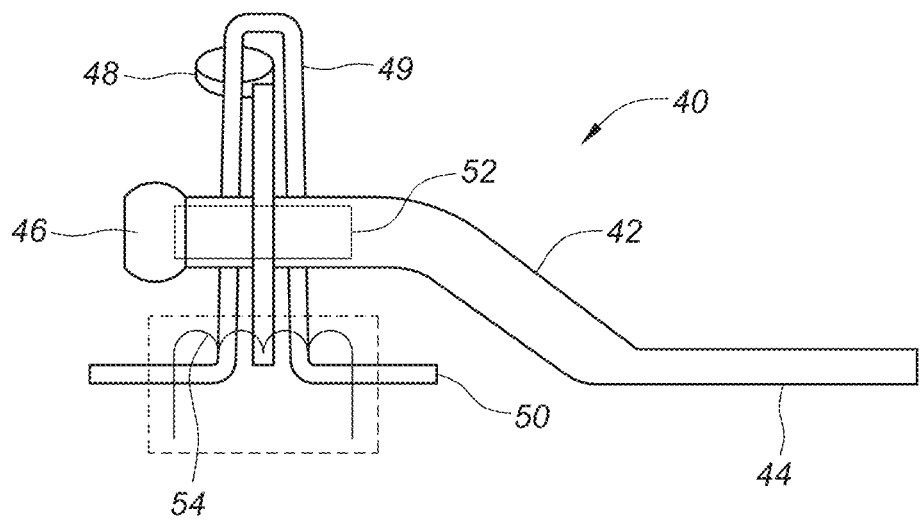

FIGS. 3A and 3B semi-diagrammatically illustrate a self-powered entry sensor embodied as a swiveling or pivoting latch assembly 40. FIG. 3A is a bottom plan view of the assembly 40, and FIG. 3B is a side elevation view of it. In this embodiment, the latch assembly 40 comprises a movable first element configured as a pivoting latch or clasp 48 pivotably mounted in a keeper element 49 fixed to a structural element (not shown) by means of a mounting plate 50 having mounting holes 51 that accommodate suitable fasteners (not shown). A fixed second element is configured as a pin or rod 42 that is typically fixed to an entry (not shown) or a structural element (not shown) by a base portion 44 having mounting holes 45 for accommodating fasteners (not shown). The pin or rod 42 extends from the base portion 44 to a free end 46 that is engageable with the pivoting clasp or latch 48. A magnet 52 is incorporated into the free end 46 of the pin or rod 42, and a coil 54 is provided in or near the mounting plate 50.

The pivoting latch or clasp 48 is movable between a first position in which it is engageable with the free end 46 of the pin 42 to provide a latched state, and a second position in which it is disengaged from the pin or rod 42 to provide an unlatched state. With the latch 48 in the unlatched state, the free end 46 of the pin or rod 42 may be moved relative to the keeper element 49, thereby providing movement of the magnet 52 relative to the coil 54, whereby a current is induced in the coil 54 that is directed to the energy-harvesting circuitry described below. It will be appreciated that, in this embodiment, the movement of the latch 48 to the second position releases the pin 42 for movement relative to the latch 48. Only when the pin 42 is moved relative to the latch 48 is the magnet 52 in the free end 46 of the pin 42 moved relative to the coil 54 to generate a current.

Figure 4:
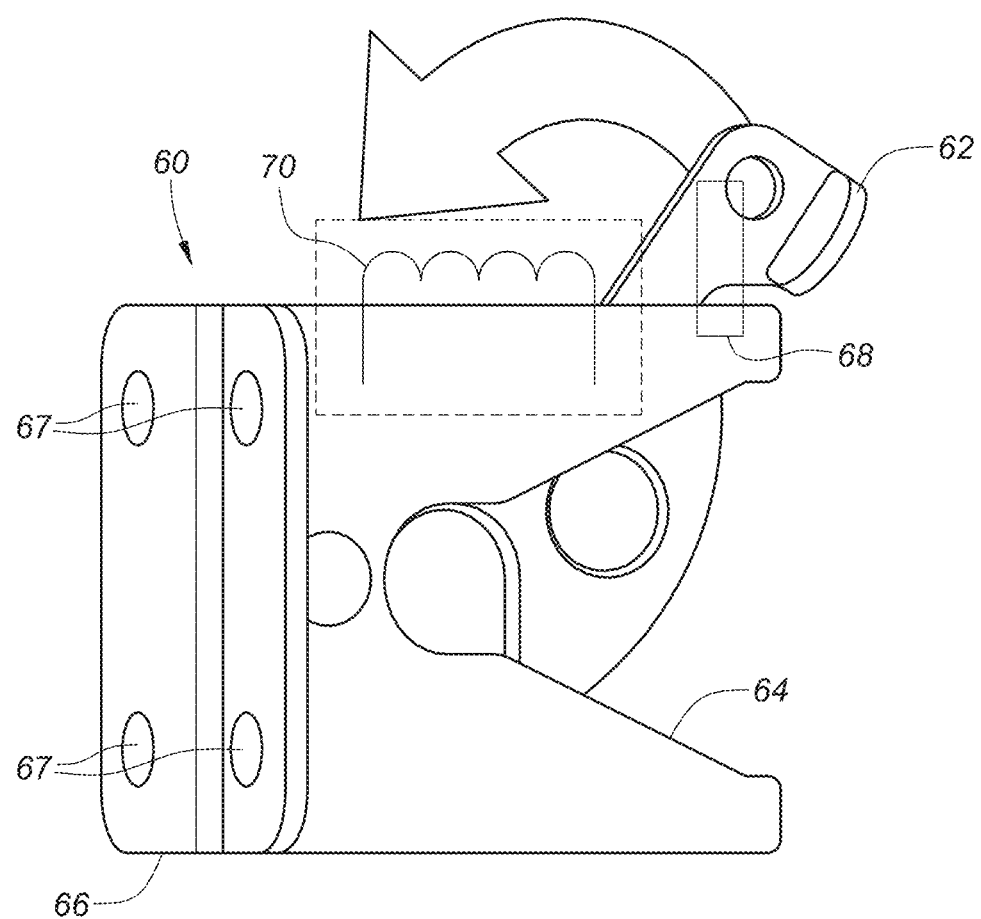
FIG. 4 is a semi-diagrammatic view of a door or window latch with a self-powered entry sensor in accordance with still another embodiment of this disclosure.

FIG. 4 illustrates a pivoting latch assembly 60 that is a variant of that shown in FIGS. 3A and 3B. This variant is similar to the above-described pivoting latch assembly 40, except for the locations of the magnet and coil, which, in this variant, allow the current to be generated without moving the pin relative to the latch or clasp. Specifically, the swiveling or pivoting latch assembly 60 includes a pivotable clasp or latch 62 as a movable element that is pivotably mounted in a keeper element 64 fixed to a structural element (not shown) by means of a mounting plate 66 having mounting holes 67 that accommodate suitable fasteners (not shown). A magnet 68 is embedded in the latch 62, and a coil 70 is provided in or adjacent to the keeper element 64 in a position in which rotation of the latch 62 causes the magnet 66 to move relative to the coil 68 in a way that induces a current in the coil 68. As in the previously described embodiments, the motion of the magnet 68 relative to the coil 70 induces a current in the coil 70 that is directed to an energy-harvesting circuit, as discussed below.

Figures 5A, 5B:
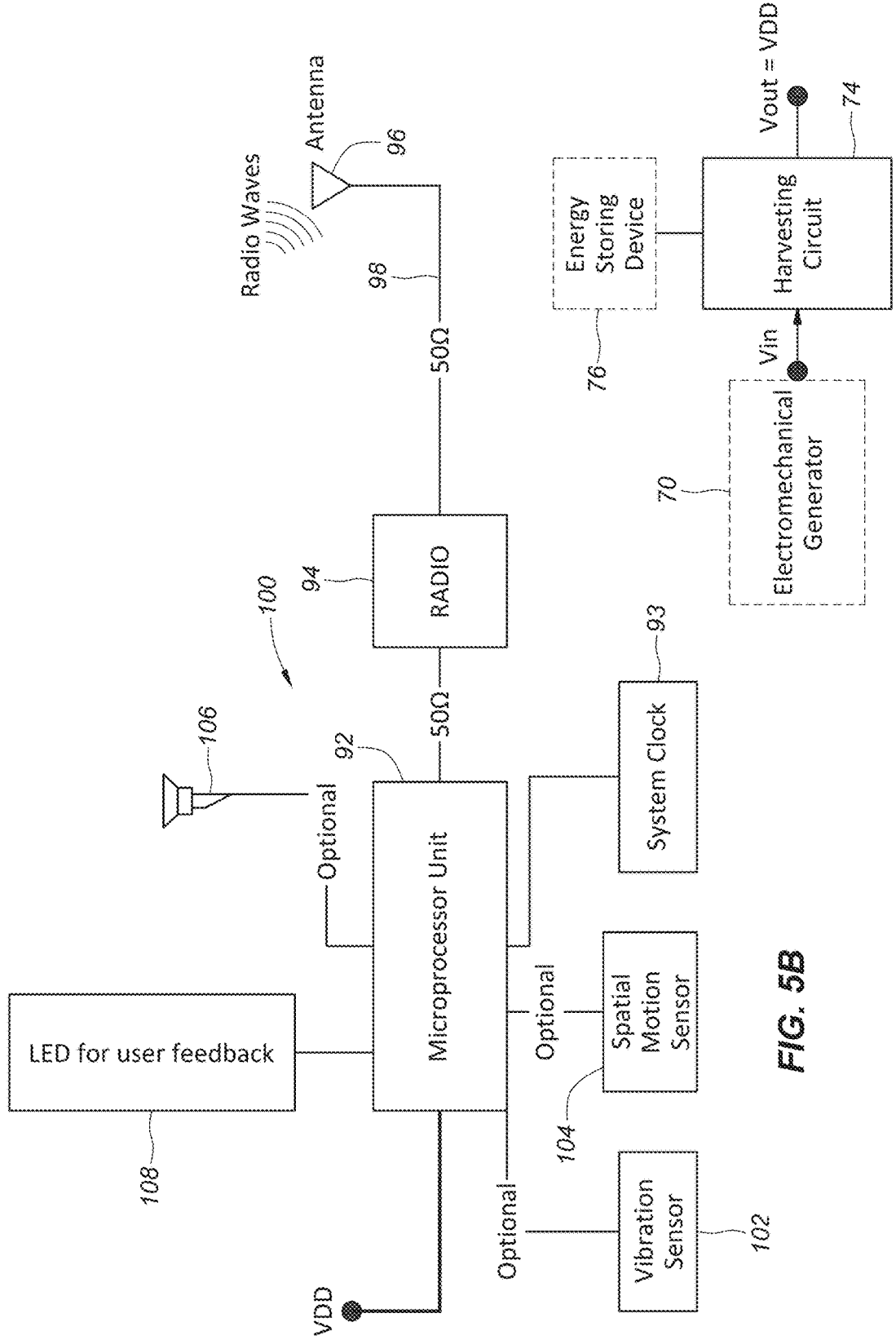
FIG. 5A is a functional block diagram of a power supply that may be employed to convert the electrical energy generated by operation of the latch assembly into power for an entry alarm in accordance with this disclosure may be used.
FIG. 5B is a diagrammatic representation of an alarm system that may be powered by the power supply of FIG. 5A.

FIG. 5A is a block diagram of an exemplary power supply circuit for use in self-powered entry sensors in accordance with this disclosure. In the lower right is a block 70 labelled "Electromechanical Generator" that represents the devices described above and equivalents thereof. As described above, the actuation of any of the latch assemblies 10, 40, 50, 60 generates an induced current in one or more coils. The operation of the latch assembly in a first direction (e.g., from unlatched to latched) induces a current spike of a first polarity in one or more inductor coils. Operation in the opposite direction (e.g., from latched to unlatched) induces a current spike of like magnitude and opposite polarity in the inductor coil(s).

The output of the coil(s), in the form of current spikes of alternating polarity, is input to an energy-harvesting circuit 74, which outputs a system power voltage $V_{DD}$. An energy storage device 76 (such as a capacitive device and/or a rechargeable battery) may optionally be coupled to the energy-harvesting circuit 74 to assure that $V_{DD}$ remains substantially constant over time, particularly if there are significant intervals between operative actuations of the latch assembly. If the energy storage device 76 is used, the output of the energy harvesting circuit 74 is first input to the energy storage device 76 before being output as $V_{DD}$. In some embodiments voltage regulation circuitry may be part of the energy-harvesting circuit, for example to regulate the output voltage to $V_{DD}$ and/or to regulate voltage provided to the energy storing device.

Energy-harvesting circuits are well-known, as shown in the following publications: M. R. Sarker et al., "Designing a Battery-Less Piezoelectric-Based Energy Harvesting Interface Circuit with 300 mV Startup Voltage," 2013 *J. Phys.: Conf. Ser.* 431 012025; Linear Technology Corp., "LTC3331 Nanopower Buck-Boost DC/DC with Energy Harvesting Battery Charger," Milpitas, CA (2104). The disclosures of these publications are incorporated herein by reference. Devices such as those disclosed in these publications, or equivalents, could be readily adapted for use as or in an energy-harvesting circuit for the purposes of this disclosure.

The energy-harvesting circuit 74 may incorporate or include a power supply, a specific example of which is illustrated schematically in FIG. 6. As shown, the current spikes from the inductor coil(s) L are rectified by a rectifier 72, shown as a full wave rectifier, but which could be a half-wave rectifier. The rectified output of the rectifier 72 is used to charge an energy storage device, such as a capacitor C1 (or, alternatively, a rechargeable battery, not shown), from which the system power voltage $V_{DD}$ is drawn for powering a monitoring or alarm circuit 100, an example of which is shown in FIG. 5B, as described below.

FIG. 7 illustrates functionally another exemplary embodiment of a power supply that may be included in, or functionally associated with, the energy harvesting circuit 74 shown in FIG. 5A. The output of the coil(s) L is input to a rectifier 72, which may be of the general type described above, as shown, for example, in FIG. 6. The rectified voltage signal from the rectifier 72 is output to a DC-DC voltage regulator 78, of a type well-known in the art, which outputs a DC voltage at a level suitable for storage in an energy storage device 76, such as, for example, a capacitor (e.g., as shown in FIG. 6 as C1), or a rechargeable battery (not shown). In some embodiments the DC-DC voltage regulator 78 may be omitted, or may be replaced by another device, for example a transimpedance device. The output of the voltage storage device 76 is fed into a power management circuit or system 80 of a type well-known in the art, which produces a voltage, typically 1.2 V in common implementations, that is suitable for powering the load 90, which may include a microprocessor 92 in the monitoring or alarm circuit 100 in FIG. 5B. In some embodiments the power management circuit or system may be, for example a DC-DC voltage regulator, for example a low drop off (LDO) voltage regulator.

Referring now to FIG. 5B, the microprocessor 92 (which may include or be responsive to a system clock 93) controls an RF transmitter (or equivalent) 94 to send an alarm signal in response to the current induced in the coil(s) by movement of the movable element (i.e., the latch or bolt), as described above. The signal is transmitted to a suitable receiver (not shown) by an antenna 96 that may be coupled to the transmitter 94 by means such as a cable 98 (e.g., 50 ohm coax). Alternatively, the transmitter 94 may be a wireless transmitter coupled to a receiver through a router (not shown). The alarm signal is received by a monitoring or alarm device or system (not shown), of any suitable type that may be known in the art. The system 100 may optionally include a vibration sensor 102 and/or a spatial motion sensor 104 providing inputs to the microprocessor 92, indicating unauthorized attempts to open the entry. The system 100 may also optionally include an audible alarm 106 and/or a visible indicator, such as an LED 108 or equivalent, that are energized by the microprocessor 92 when the latter transmits the alarm signal.

FIG. 8 shows schematically another aspect of the power supply of FIG. 5B that may be employed in embodiments of the disclosure. In accordance with this aspect, the electromechanical generator 70 (FIG. 5A) may include a first coil or winding L1 having first and second terminals connected by a first diode D1, and a second coil or winding L2 having first and second terminals connected by a second diode D2. The first terminal of each of the coils L1 and L2 is connected to a separate input to the microprocessor 92. The first and second diodes D1 and D2 are connected in opposite polarities, thereby functioning as half-wave rectifiers for the current pulses respectively induced in the first and second coils L1 and L2. In this way, movement of the latch or bolt magnet in a first direction induces a current pulse having a first polarity, and movement in the second, opposite direction induces a current pulse of the opposite polarity. The polarity of the pulse is read by the microprocessor as an indication of whether the latch or bolt is moved from latched to unlatched, or from unlatched to latched.

Other mechanisms that can be used to detect the position of the bolt or latch or its direction of movement are shown in FIG. 9. These include, for example, a magneto-resistive sensor 110, a Hall effect sensor 112, or a 3-position switch that has a movable contact on the bolt or latch, and stationary contacts at defined positions on the fixed portions of the latch mechanism.

Figure 10:
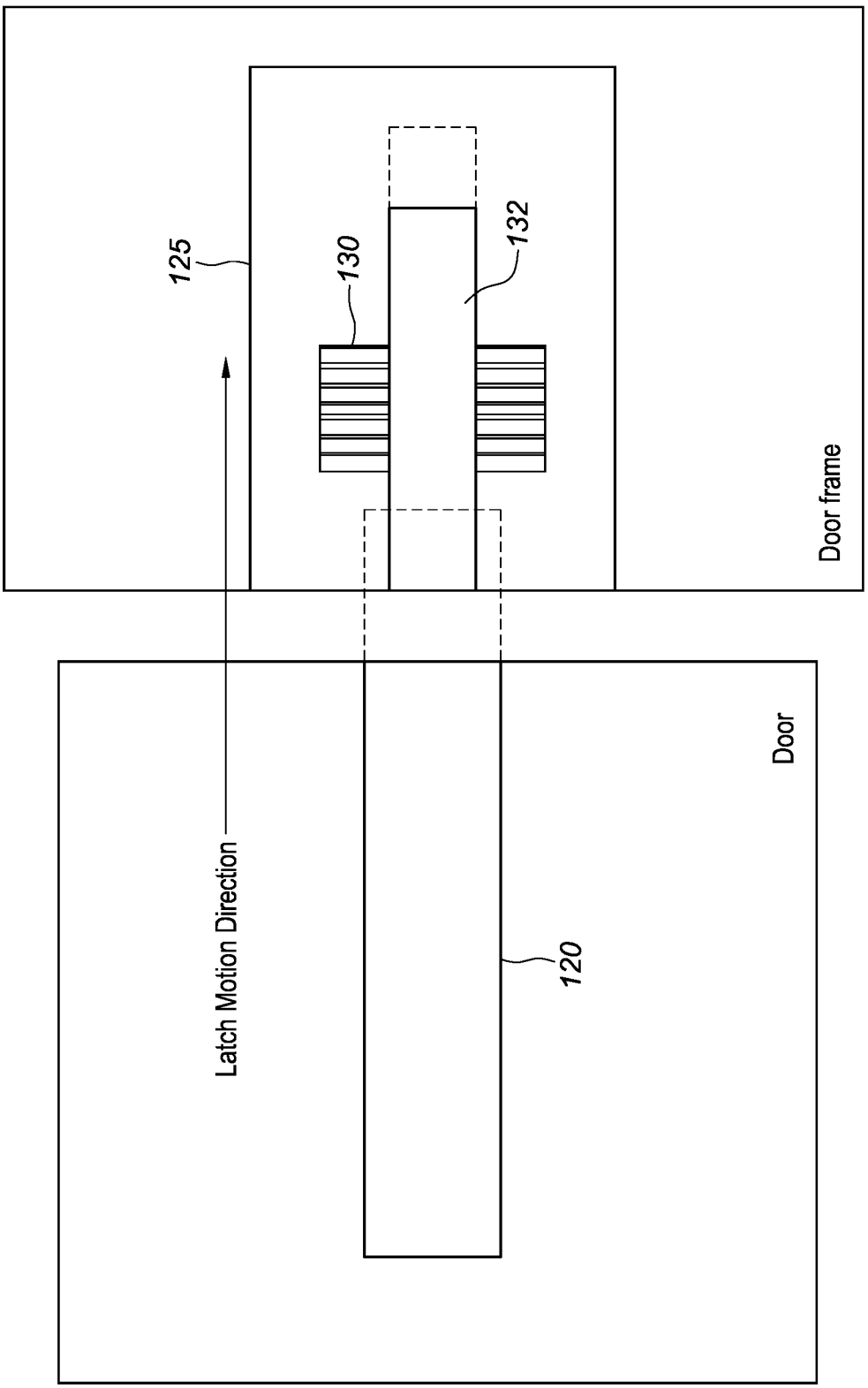
FIG. 10 diagrammatically illustrates a latch engaging a secondary mechanical system comprising a magnet and coil within the same mechanical housing.

FIG. 10 shows an alternative variation of generating an induced electric current though coupling a latch mechanism to a secondary electromechanical system. The latch mechanism may be installed in or fixed to an entry, such as a door or window. The secondary electromechanical system includes a magnet 132 and a coil 130, both within one housing 125 installed in or on a structural element, e.g., a door frame. It is understood that the latch mechanism may be installed in or on the structural element, and the electromechanical system housing 125 may be installed in or on an entry.

The secondary electromechanical system is triggered by the motion of a moving latch element 120 to enable a linear or angular motion of the magnet 132 inside the coil 130 within the housing 125 so that an electric current is induced in the coil 130. The moving latch element 120 of the latch mechanism can be moved into engagement with the magnet 132 so as to move the magnet 132 into the coil 130 as the moving latch element 120 moves to a latched position. Alternatively, the secondary electromechanical system can be provided on the entry adjacent the latch mechanism such that the moving latch element 120 can contact and move the magnet 132 through the coil 130 as the moving latch element 120 moves to an unlatched position.

Although specific exemplary embodiments of the disclosure a described in the above specification and drawings, it will be understood that variations and modifications of these embodiments may suggest themselves to those skilled in the pertinent arts, and should therefore be considered within the spirit and scope of this disclosure.

The invention claimed is:

1. An entry latch alarm system for sensing the movement of an entry latch assembly between a latched state and an unlatched state, the alarm system comprising:
   a latch assembly having a movable element mounted on one of an entry and a structural element, and a fixed element mounted on the other of the entry and the structural element, wherein the movable element is movable between a first position engaged with the fixed element when the latch assembly is in the latched state, and a second position disengaged from the fixed element when the latch assembly is in the unlatched state;
   at least one magnet in one of the movable element and the fixed element;
   at least one coil in the other of the movable element and the fixed element;
   wherein the at least one magnet and the at least one coil are positioned relative to each other so that an electric current is induced in the at least one coil by the at least one magnet when the movable element is moved between the first position and the second position;
   an energy harvesting circuit connected to the coil and configured for converting the induced electric current into a supply voltage; and
   an alarm system powered by the supply voltage.

2. The entry latch alarm system of claim 1, wherein the movable element includes a linearly-slidable bolt and the fixed element includes a bolt receptacle.

3. The entry latch alarm system of claim 2, wherein the bolt is linearly movable within a sleeve so as to engage with the bolt receptacle in the latched state, and to disengage from the bolt receptacle in the unlatched state, and wherein the bolt includes the at least one magnet positioned so that the at least one magnet moves with the bolt.

4. The entry latch alarm system of claim 3, wherein the at least one coil is provided in the sleeve.

5. The entry latch alarm system of claim 3, wherein the at least one coil is provided in the fixed element adjacent to the bolt receptacle.

6. The entry latch alarm system of claim 1, wherein the movable element includes a pivotable latch, and wherein the fixed element includes a pin, the pin and latch being configured so that the pin is engaged by the latch when the latch is in the first position and the pin is disengaged from the latch when the latch is in the second position.

7. The entry latch alarm system of claim 6, wherein the latch is pivotably mounted in a keeper element including the at least one coil, and wherein the pin includes the at least one magnet positioned so that the at least one magnet moves with the pin, wherein the at least one magnet moves relative to the at least one coil when the pin is moved relative to the latch when the latch is in the second position.

8. The entry latch alarm system of claim 6, wherein the latch is pivotably mounted in a keeper element including the at least one coil, and wherein the latch includes the at least one magnet positioned so that the at least one magnet moves with the latch, wherein the at least one magnet moves relative to the at least one coil as the latch is moved between the first position and the second position.

9. An energy-generating entry latch assembly, comprising:
   a movable element and a fixed element, the moveable element being moveable relative to the fixed element from a latched position to an unlatched position, the fixed element blocking movement of the moveable element in a locked direction when the moveable element is in the latched position, the fixed element not blocking movement of the moveable element in the locked direction when the moveable element is in the unlatched position;
   a magnet in one of the movable element and the fixed element;
   a coil in the other of the movable element and the fixed element, wherein movement of the movable element relative to the fixed element induces an electric current in the coil; and
   an energy harvesting circuit operably connected to the coil and configured for converting the electric current into a supply voltage.

10. The energy-generating entry latch assembly of claim 9, wherein the movable element includes a linearly-slidable bolt and the fixed element includes a bolt receptacle.

11. The energy-generating entry latch assembly claim 10, wherein the bolt is linearly movable within a sleeve so as to engage with the bolt receptacle in the latched state, and to disengage from the bolt receptacle in the unlatched state, and wherein the bolt includes the at least one magnet positioned so that the at least one magnet moves with the bolt.

12. The energy-generating entry latch assembly of claim 11, wherein the at least one coil is provided in the sleeve.

13. The energy-generating entry latch assembly of claim 11, wherein the at least one coil is provided in the fixed element adjacent to the bolt receptacle.

14. The energy-generating entry latch assembly of claim 9, wherein the movable element includes a pivotable latch, and wherein the fixed element includes a pin, the pin and latch being configured so that the pin is engaged by the latch when the latch is in the first position and the pin is disengaged from the latch when the latch is in the second position.

15. The energy-generating entry latch assembly of claim 14, wherein the latch is pivotably mounted in a keeper element including the at least one coil, and wherein the pin includes the at least one magnet positioned so that the at least one magnet moves with the pin, wherein the at least one magnet moves relative to the at least one coil when the pin is moved relative to the latch when the latch is in the second position.

16. The energy-generating entry latch assembly of claim 14, wherein the latch is pivotably mounted in a keeper element including the at least one coil, and wherein the latch includes the at least one magnet positioned so that the at least one magnet moves with the latch, wherein the at least one magnet moves relative to the at least one coil as the latch is moved between the first position and the second position.

17. A method of powering an entry alarm system, comprising:
moving a movable element of an entry latch assembly relative to a fixed element of the entry latch assembly, a magnet being on one of the movable element and the fixed element, a coil being on the other of the movable element and the fixed element;
inducing a current by movement of the movable element of the entry latch assembly relative to the fixed element of the entry latch assembly from a latched position to an unlatched position, the fixed element blocking the moveable element from moving in a locked direction when the moveable element is in the latched position, the fixed element not blocking movement of the moveable element in the locked direction when the moveable element is in the unlatched position;
converting the induced current into a supply voltage; and
using the supply voltage to power the entry alarm system.

18. The method of claim 17, wherein the induced current is converted into the supply voltage by an energy harvesting circuit.

19. The method of claim 18, wherein the energy harvesting circuit includes a power supply including a rectifier and an energy storage device.

20. The energy-generating entry latch assembly of claim 9, wherein when the moveable element moves from the unlatched position to the latched position the induced electric current has a first polarity, and when the moveable element moves from the latched position to the latched position the induced electric current has a second polarity opposite the first polarity.

21. The energy-generating entry latch assembly of claim 20, wherein the energy harvesting circuit is configured to communicate the polarity of the induced electric current to an alarm system.

* * * * *